(12) United States Patent
Lohmar et al.

(10) Patent No.: US 11,665,220 B2
(45) Date of Patent: May 30, 2023

(54) MONITORING AND SURVEILLANCE SYSTEM ARRANGED FOR PROCESSING VIDEO DATA ASSOCIATED WITH A VEHICLE, AS WELL AS CORRESPONDING DEVICES AND METHOD

(71) Applicant: Telefonaktiebolaget LM Ericsson (publ), Stockholm (SE)

(72) Inventors: Thorsten Lohmar, Aachen (DE); Ali El Essaili, Aachen (DE); Mohamed Ibrahim, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/276,286

(22) PCT Filed: Oct. 12, 2018

(86) PCT No.: PCT/EP2018/077895
§ 371 (c)(1),
(2) Date: Mar. 15, 2021

(87) PCT Pub. No.: WO2020/074097
PCT Pub. Date: Apr. 16, 2020

(65) Prior Publication Data
US 2022/0038520 A1 Feb. 3, 2022

(51) Int. Cl.
*H04L 29/06* (2006.01)
*H04L 65/80* (2022.01)
(Continued)

(52) U.S. Cl.
CPC .......... *H04L 65/80* (2013.01); *B61L 15/0027* (2013.01); *B61L 27/70* (2022.01); *H04L 47/626* (2013.01); *H04N 7/181* (2013.01)

(58) Field of Classification Search
CPC ... B60R 1/00; B60R 2300/50; B61L 15/0027; B61L 15/0081; B61L 23/041;
(Continued)

(56) References Cited

U.S. PATENT DOCUMENTS 6,862,298 B1 * 3/2005 Smith .................. H04J 3/0632
370/429
9,565,139 B2 * 2/2017 Veiga .................. H04L 49/9005
(Continued)

FOREIGN PATENT DOCUMENTS

DE 102015014750 A1 5/2017
WO 2012076904 A1 6/2012

OTHER PUBLICATIONS

"BL1004VI-El-A", Sigura B. V., Version 1.4; TKH Security, TKH Group; https://siqura.com/wp-content/uploads/2018/01/B L1004VI-EI-A v1.4 -DS-EN.pdf, Jan. 1, 2017, pp. 1-3.
(Continued)

*Primary Examiner* — Thai Q Tran
*Assistant Examiner* — Stephen R Smith
(74) *Attorney, Agent, or Firm* — Murphy, Bilak & Homiller, PLLC (57) ABSTRACT

A monitoring and surveillance system arranged for processing video data associated with a vehicle, wherein said system is arranged to operate in at least two operating modi, a first modus of said two modi being associated with a first latency requirement for said video data and a second modus of said two modi being associated with a second latency requirement, said system comprising a camera unit, arranged to be installed in said vehicle, wherein said camera unit is arranged for capturing video data; a streaming unit, arranged to be installed in said vehicle, and arranged for receiving said video data and for transmitting said video data over a telecommunication network to a video processing server;
(Continued)

said video processing server arranged for selecting a modus of said at least two operating modi, and for communicating said selected modus, over said telecommunication network, to said camera unit such that said streaming unit can be tuned to said selected modus. Complementary systems and methods are also presented herein.

14 Claims, 4 Drawing Sheets (51) Int. Cl.
*B61L 27/70* (2022.01)
*B61L 15/00* (2006.01)
*H04L 47/625* (2022.01)
*H04N 7/18* (2006.01)

(58) Field of Classification Search
CPC ........ B61L 27/70; H04L 47/626; H04L 65/80; H04N 21/2662; H04N 21/6377; H04N 21/64792; H04N 7/18; H04N 7/181
USPC ............... 348/148, 384.1; 370/394, 516
See application file for complete search history.

(56) References Cited

U.S. PATENT DOCUMENTS

| | | | | |
|---|---|---|---|---|
| 2009/0285217 | A1* | 11/2009 | Frink ............... | H04N 21/23655 370/394 |
| 2012/0250762 | A1* | 10/2012 | Kaye ................. | H04L 47/25 375/240.07 |
| 2012/0314127 | A1* | 12/2012 | Syed ................ | H04N 21/64746 348/E7.045 |
| 2014/0192893 | A1* | 7/2014 | Sullivan ............. | H04N 19/46 375/240.25 |
| 2017/0347133 | A1* | 11/2017 | Wang ................ | H04W 12/06 |
| 2018/0054851 | A1* | 2/2018 | Condeixa ............ | H04W 88/04 |
| 2018/0297543 | A1 | 10/2018 | Loeffler | |
| 2020/0105111 | A1* | 4/2020 | Messer ............ | G08B 13/19678 |

OTHER PUBLICATIONS

"ONVIF TM Application Programmer's Guide", ONVIF APG—Ver. 1.0; https://www.onvif.org/wp-content/uploads/2016/12/ONVIF_WG-APG-Application_Programmers_Guide-1.pdf?ccc393 &ccc393, May 2011, pp. 1-201.

* cited by examiner

MONITORING AND SURVEILLANCE SYSTEM ARRANGED FOR PROCESSING VIDEO DATA ASSOCIATED WITH A VEHICLE, AS WELL AS CORRESPONDING DEVICES AND METHOD

FIELD OF THE INVENTION

The present disclosure generally relates to the field of a monitoring and surveillance system and, more specifically, to an assembly arranged to be installed in a vehicle for capturing video and a video processing server for processing the captured video.

BACKGROUND

Nowadays, trains and other vehicles may have two types of camera systems installed. A front facing camera may be deployed at the front of a train which front facing camera observes forwards, i.e. towards the track over which the train is to be steered. The front facing camera may be used for advanced driver assistance functions, such as obstacle on track detection or the like. The images of the front facing camera may also be recorded as surveillance feed which can be used later for, for example, accident examination.

Another type of camera is the surveillance camera like a CCTV system. Surveillance cameras are often mounted in wagons. Typically, two surveillance cameras are mounted in a single wagon. When the trains has, for example, ten wagons, there are twenty or more cameras on-board. The default operation would be to store the CCTV feeds on storage systems inside the trains, and be frequently moved to a central storage system.

Surveillance cameras are typically sued to examine an incident, after the incident has occurred. Such incidents may be pickpocketing thefts, vandalism, or anything alike.

For self-driving cars, i.e. autonomous driving, and remote-driven vehicles, the inventors have found that there is a desire to use the CCTV cameras for monitoring purposes to secure, that the vehicle operations are according to plan. For monitoring purposes, it is necessary to stream the video data of the CCTV cameras into an operation control centre. One of the problems here is that the video feeds of only some, or at most one, camera should be streamed in order to save uplink bandwidth, and resulting transmission costs.

Surveillance and remote monitoring cameras are often operating with a certain delay, configured at implementation or at camera installation, in order to optimize bitrate and quality. Further, surveillance cameras are often operating with a fixed quality, i.e. resolution and resulting encoding target bitrate, which is also configured at device implementation, hard coded, or at device installation. For remote-driven or autonomous driving vehicles, there is sometimes the need to interact with the passengers and therefore the need to turn the camera system for surveillance into unidirectional conversational mode. As a result, the network and content jitter buffers should be reduced and optionally the codec configuration may be changed. A codec configuration for conversational often operates with different encoder features and also with lower bitrates to reduce latency. There is currently no direct latency control solution, which modifies the buffer level on the sender and the receiver side, while the stream is active.

SUMMARY

It would be advantageous to provide for a monitoring and surveillance system that is able to be adequately used for monitoring and for surveillance purposes.

It would also be advantageous to provide for method that is able to adequately operate a monitoring and surveillance system.

In a first aspect, there is provided a monitoring and surveillance system arranged for processing video data associated with a vehicle, wherein said system is arranged to operate in at least two operating modi, a first modus of said two modi being associated with a first latency requirement for said video data and a second modus of said two modi being associated with a second latency requirement.

The system comprising:
  a camera unit, arranged to be installed in said vehicle, wherein said camera unit is arranged for capturing video data;
  a streaming unit, arranged to be installed in said vehicle, and arranged for receiving said video data and for transmitting said video data over a telecommunication network to a video processing server;
  said video processing server arranged for selecting a modus of said at least two operating modi, and for communicating said selected modus, over said telecommunication network, to said camera unit such that said streaming unit can be tuned to said selected modus.

The inventors have found that the monitoring and surveillance system should be able to cope with at least two modi, wherein each of the modus required a different latency setting.

A first modus may, for example, be directed to the monitoring aspect and a second modus may, for example, be directed to the surveillance aspect. In any case, the latency requirement of the first modus differs from the latency aspect of the second modus.

In accordance with the present disclosure, the video processing server selects a modus to be used for the monitoring and surveillance system. That is, the video processing server determines, i.e. selects, in which of the at least two modi the system should be operative.

Once a selection is made, that particular selection is to be communicated to the camera unit, such that the streaming unit can be tuned to the selected modus. The streaming unit needs, for example, to know what the latency requirement is in order to make sure that video packets are timely transmitted, over the telecommunication network, to the video processing server.

In accordance with the present disclosure, the camera unit and the streaming unit are deployed in a vehicle, for example a train, drone, aircraft, or anything alike. The video captured by the camera unit may be stored locally, i.e. without communicating the video data to the outside world. Alternatively, or in addition to, storing the video data locally, the streaming unit may transmit the video data to a video processing server which is accessible over the telecommunication network. The video processing server may be located inside the telecommunication network, or, for example, somewhere in the internet. In accordance with the present disclosure, the video processing server is reachable via the telecommunication network, for example via a Third Generation, 3G, connection, a Fourth Generation, 4G, connection or even a Fifth Generation, 5G, connection.

It is noted that the monitoring and surveillance system is arranged for processing video data associated with a vehicle. The monitoring and surveillance system may, alternatively, also be used for processing video data associated with non-vehicles. For example, the monitoring and surveillance system may be arranged for processing video data associated with a particular venue, a festival, a building, an office, a particular location, a park or anything alike.

In an example, the streaming unit comprises a transmitting queue arranged for queuing video data packets to be transmitted to said video processing server, and wherein said video processing server comprises a receiving queue arranged for queuing video data packets received from said streaming unit.

The inventors have found that the timing delay may be composed of several components. One of the components is directed to the transmitting queue, and the amount of packets already residing in the transmitting queue. Another component is directed to the receiving queue and the amount of packets residing in the receiving queue. Yet another component is directed to the communication time, i.e. the time required to send the packets from the streaming unit to the video processing unit. The latter may also encompass the time delay encountered by the wireless communication channel, as well as all kinds of MAC layer protocol delays.

In a further example, the video processing server is further arranged to switch from said first modus to said second modus, and wherein said streaming unit and said video processing server are arranged for discarding video data packets in their respective queue which are older than said second latency requirement. The inventors have found a solution in which the system decides to switch from the first modus to the second modus, more particularly to a modus in which there is a first latency to a modus in which there is a second latency requirement, wherein the second latency requirement is stricter compared to the first latency requirement.

The solution is that all packets in the respective may be assigned a particular timing parameters. The timing parameter relates to the position of the video packet in the queue as well as the communication time. Packets having a timing parameter older than the second latency requirement may, subsequently, be discarded when switching from the first modus to the second modus.

In a further example, the streaming unit is arranged for determining a due deadline for transmitting a video data packet in said transmitting queue to said video processing server based on at least one of:
   a network jitter buffer duration;
   frame durations of preceding video data packets present in said transmitting queue.

In yet another example, the system comprises a plurality of camera units and a single streaming unit, wherein each of said plurality of camera units is arranged to provide video data to said single streaming unit.

The inventors have found that, typically, in a vehicle multiple camera units are deployed. For example, in train wagons often two camera units are deployed. The amount of camera units then relates to the amount of train wagons. Only one streaming unit may be deployed, wherein that one streaming unit is receiving the video data from all of the camera units separately.

In a second aspect, there is provided an in-vehicle camera assembly arranged for capturing video data with respect to monitoring and surveillance, wherein said in-vehicle assembly is arranged to operate in at least two operating modi, a first modus of said two modi being associated with a first latency requirement for said video data and a second modus of said two modi being associated with a second latency requirement.

The assembly comprising:
   a camera unit, arranged to be installed in said vehicle, wherein said camera unit is arranged for capturing video data;
   a streaming unit, arranged to be installed in said vehicle, and arranged for receiving said video data and for transmitting said video data over a telecommunication network to a video processing server;
   wherein said camera unit is further arranged for receiving a selected modus, from said video processing server, over said telecommunication network, and for tuning said streaming unit based on said received modus.

The advantages of the first aspect of the disclosure are also inherently a part of the second aspect, and third aspect, of the disclosure. Furthermore, it is pointed out that although the claims read as if all the modules/equipment/units according to this second aspect of the present disclosure are incorporated into a device, a person skilled in the art understands that the same disclosure could be implemented by, for example, distributing each of the modules/equipment/units over multiple devices.

Further, it is noted that the equipment may also be referred to as a module, unit, device or anything alike.

In a further example, the streaming unit comprises a transmitting queue arranged for queuing video data packets to be transmitted to said video processing server.

In yet another example, the received modus is said second modus such that said modus switches from said first modus to said second modus, wherein said streaming unit is arranged for discarding video data packets in said transmitting queue which are older than said second latency requirement.

In an even further example, the streaming unit is arranged for determining a due deadline for transmitting a video data packet in said transmitting queue to said video processing server based on at least one of:
   a network jitter buffer duration;
   frame durations of preceding video data packets present in said transmitting queue.

In an example, the assembly comprises a plurality of camera units and a single streaming unit, wherein each of said plurality of camera units is arranged to provide video data to said single streaming unit.

In a third aspect of the present disclosure, there is provided a method of operating a monitoring and surveillance system in accordance with any of the examples as provided above, wherein said method comprises the steps of:
   capturing, by said camera unit installed in said vehicle, video data;
   receiving, by said streaming unit installed in said vehicle, said video data and transmitting said video data over said telecommunication network to said video processing server;
   selecting, by said video processing server, a modus of said at least two operating modi, and communicating said selected modus, over said telecommunication network, to said camera unit such that said streaming unit can be tuned to said selected modus.

In an example, the method comprises the steps of:
   switching, by said video processing server, from said first modus to said second modus, and
   discarding, by said streaming unit and by said video processing server, video data packets in their respective queue which are older than said second latency requirement.

In a fourth aspect of the present disclosure, there is provided a method for capturing video data with respect to monitoring and surveillance using an in-vehicle camera assembly in accordance with any of the examples as provided above, wherein said method comprises the steps of:
   capturing, by said camera unit, video data;

receiving, by said streaming unit, said video data and transmitting, by said streaming unit, said video data over a telecommunication network to a video processing server;

receiving, by said camera unit, a selected modus, from said video processing server, over said telecommunication network, and tuning said streaming unit based on said received modus.

In a fifth aspect of the present disclosure, there is provided a computer program product comprising a computer readable medium having instructions which, when executed by a monitoring and surveillance system cause said system to implement a method in accordance with any of examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
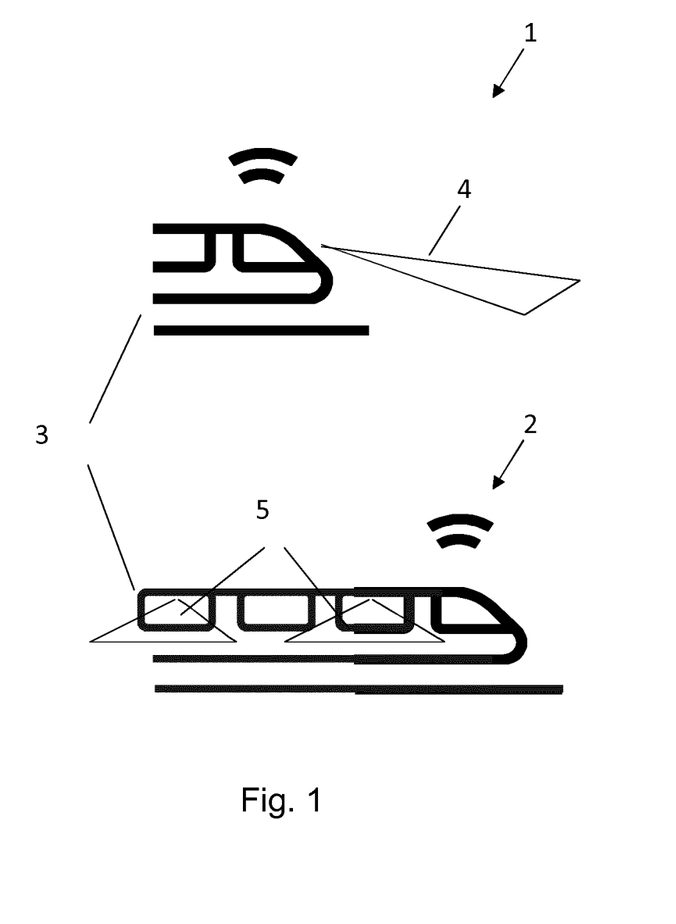
FIG. 1 discloses an example of a vehicle having a front facing camera as well as in wagon camera's.

FIG. 1 discloses an example of a vehicle 1, more particularly a train 3, having a front facing camera as well as in wagon cameras.

The front facing camera has a viewing angle as indicated with reference numeral 4. The front facing camera may aid in driver assistance functions, such as obstacle on track detection or the like.

The train may also have one or more surveillance cameras, as depicted using reference numeral 2, which are mounted inside the wagons of the train. The surveillance camera's thus monitor the inside of wagons. The viewing angle is, schematically, indicated with reference numeral 5.

The trains as indicated with reference numeral 3 may be combined into a single train, such that the single train comprises the front facing camera as well as in wagon cameras.

Figure 2:
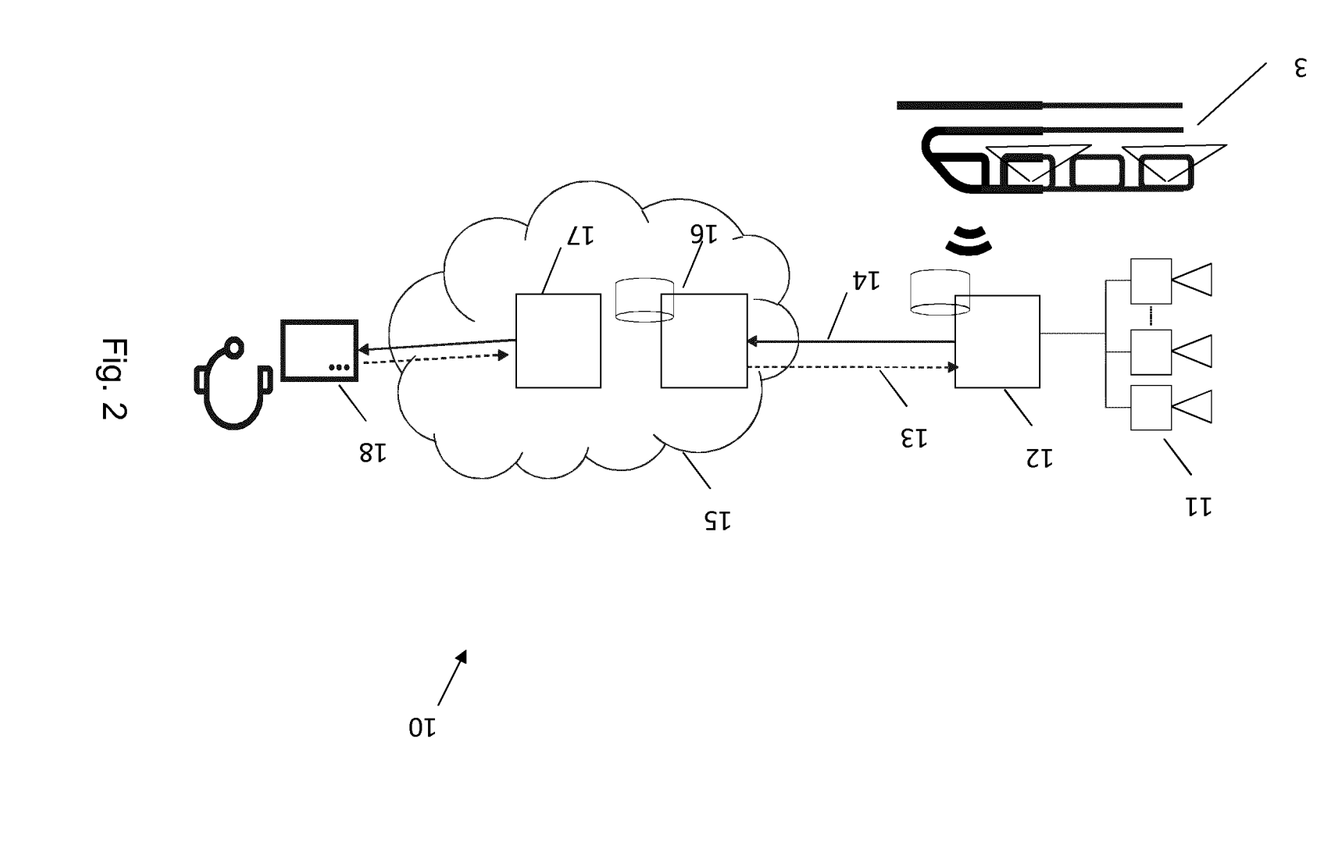
FIG. 2 illustrates a system according to the present disclosure.

FIG. 2 illustrates a system 10 according to the present disclosure. The various CCTV cameras 11 are all connected to an In-Train platform 12, which is recording all camera feeds on a local storage system such as hard disks, for example. As a default, the in-train platform 12 may not stream any video camera into the operation center 15.

The operation center 15 can interact with the in-train platform 12 via a control connection 13. The control connection 13 may use any suitable radio interface 14. The operation center 15 may select, which camera should be up streamed, by giving instructions such as streaming start, streaming stop per camera. Such streaming may be performed optionally in addition to the local recording of the video data. The operation center 15 can also control the video quality and also the content and network jitter buffering using internal modules such as for video ingest 16 and rendering & control 17.

Figure 3:
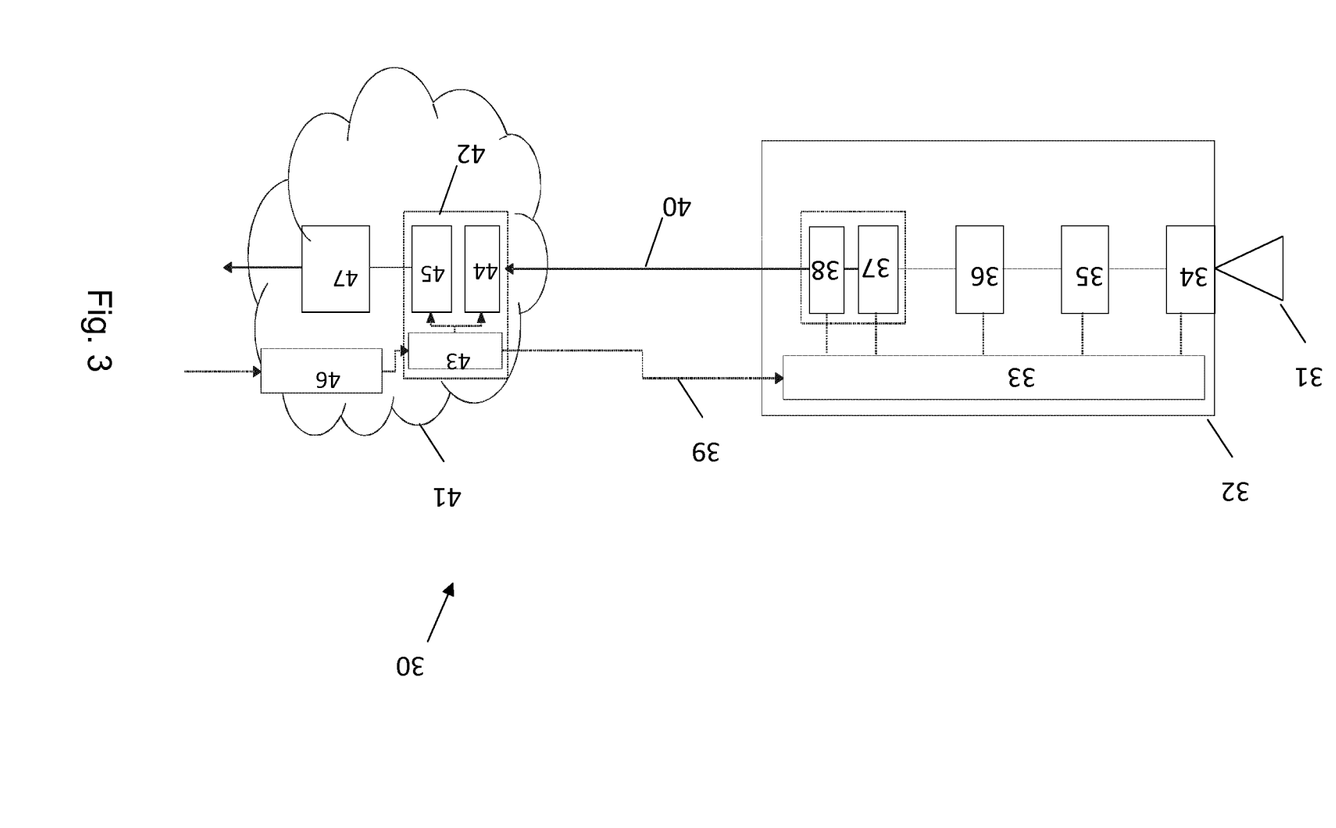
FIG. 3 illustrates a system according to the present disclosure.

In FIG. 3, reference numeral 30 illustrates a more elaborate illustration of the system according to the present disclosure. The camera 32 contains the actual video sensor 34. The sensor may be, for example, a Charge Coupled Device, CCD or a Complementary Metal Oxide Semiconductor, CMOS sensor. The camera 32 further comprise some optional video pre-processing 35, for example to remove lens distortion, and also the video encoding and packaging 36 and the streaming function 37, 38. The streamer function 37, 38 contains an in-queue 37, which store the compressed video frame until time of upstream. Reference numeral 31 refers to an input of video frames captured by the camera 32 and the numeral 33 refers to a source configuration and control module.

The Ingest server 42 handles the reception and contains also an out queue 45. The Network and Content jitter buffer management is done between the video encoding and packaging function 36 and the video processing function 47. The encoder 36 produces compressed video frames with a certain, fixed or varying, frame rate and puts the frames into the in-queue 37. On the video ingest side 42, the received compressed frames are first put into the out-queue 45. The ingest function 42 forwards the video frames to the next function—video processing 47. There is a fixed delay between in-queue 37 and out-queue 45. However, the frames might be queued either on the in-queue side or on the out queue side, depending on the current channel condition—radio link 40 between camera 32 and ingest 42. As mentioned earlier, the operation center 41 interacts with the cameras 32 on the train using a control connection 39. The operation center 41 may internally comprise of additional modules such as a sink control 43 and a controller 46.

The encoder 36 spits out encoded frames with a certain time interval, which is generally equal to the frame rate, and enqueues the frames In the in-queue 37. The radio channel 40 may be busy for some time so the streamer may not transmit frames according to the arrival rate. The streamer function knows the configured content and network jitter buffer duration and can hold back frames up to a due date. The reception of the frames may be delayed accordingly. The out queue 45 is compensating the reception jitter. The received frames sit in the out queue 45 up to a certain due date. The due date of a frame is calculated relative to an absolute receiver Reference time. For example, the out due date is calculated using the absolute receiver Reference time plus the network jitter buffer duration and the sum of the preceding frame durations.

When the controller changes from surveillance mode, with a long network and content jitter buffer duration of for example 2 seconds, to a conversational mode having a short jitter buffer of for example 50 ms, the In Queue 37 and the Out Queue 45 need to discard a set of frames corresponding to the 2000 ms-50 ms time duration. The Out Queue 45 manager is calculating the new due date target and discarding any frame, which is already older than the new due date. The same procedure occurs on the In Queue 37 side, where the in queue manager is removing any frame, which is expired already.

The ingest server 42 needs to determine the amount of discarded frames on the in queue 37 side in order to calculate the new due date correctly. The out queue manager can use the progress of the encoding timestamps or presentation timestamps or a new box.

The Source Config & Control function 33 fetches the configurations from the Sink Control function 43 using a Hypertext Transfer Protocol, HTTP, GetConfiguration command. After retrieval of the configuration, the Source Config & Control 33 parses the received configuration data and finds the protocol identifier and Uniform Resource Locator, URL, for the control connection. When a web socket is used, the protocol may be identified by the scheme "ws://". The Source Configuration and Control function 33 establishes the Web Socket connection with the Sink Control function 43 and maintains the connection using Keep alive mechanisms.

When at some later point in time the Controller 46 desires to toggle the latency to live latency, the Controller 46 sends a command to the Sink Controller 43, which then modifies the Out Queue 45 handling and also sends a Reduce In Queue Buffer duration to the Framework for Live Uplink Streaming, FLUS, Source via the established control connection.

The Camera 32 and the Encoder 36 are continuously capturing and encoding frames. The framerate may be variable, depending on the capture capability. The Encoder 36 is inserting encoded frames into the In Queue 37 according to the frame duration (i.e. variable or fixed frame rate). This process is generally not impacted by the latency modification control command.

The streamer is taking encoded frames out of the In Queue 37 and sending the frames via the transmission channel 40 according to the bitrate of the channel 40. The transmission duration may be shorter or larger than the frame duration.

The video ingest 42 is receiving frames from the channel 40 and inserting each frame into the Out Queue 45. The intention of the out queue 45 is to de-jitter and to recover the original frame rate i.e. the rate (fixed or variable) at which the encoder 36 has pushed coded frames into the In Queue 37. For this process, a due date is calculated for each frame, depending on the buffer duration and the progress of presentation times, wherein the presentation time of a frame is calculated as sum of all previous frame durations assuming here variable frame durations.

When the controller 46 instructs to toggle from surveillance to live mode, the controller 46 sends a command to the Sink Controller 43, which is then influencing the procedure to take frames from the In Queue 37 and also when to forward frames from Out Queue 45 to Process function 47.

The Out Queue Manager goes through the list of enqueued frames and calculates a new due date. The new due date is calculated based on the new jitter buffer duration from the controlled. The Out Queue manager discards any frame, which should have already been sent according to the new due date.

When the media bitrate is marginally higher than the link bitrate, the FLUS Source may not able to upstream frames according to arrival time (spitted out from the encoder) and frame duration. In this case, the parts of the frames, worth of 5 sec buffer depth, are still located in the FLUS Source buffer, while the rest is already uploaded.

Figure 4:
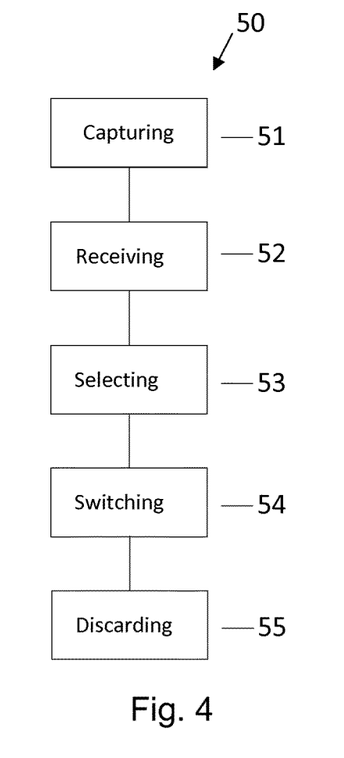
FIG. 4 illustrates a method according to the present disclosure.

The method 50 in FIG. 4 comprises the steps of capturing 51 video data, by a camera unit installed in a vehicle. In a further step of receiving 52, the streaming unit installed in the vehicle, receives the video data and also transmits the video data over a telecommunication network to a video processing server.

In a step of selecting 53, the video processing server selects a modus from at least two operating modi, and communicates the selected modus, over the telecommunication network, to the camera unit such that the streaming unit can be tuned to the selected modus.

The method 50 may further comprises the step of switching 54 the video processor, from a first modus to a second modus, and discarding 55, by the streaming unit and by the video processing server, video data packets in their respective queue which are older than said second latency requirement.

Figure 5:
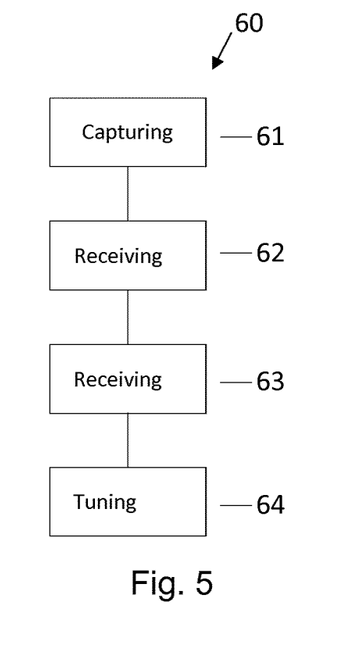
FIG. 5 illustrates a method according to the present disclosure.

The method 60 in FIG. 5 illustrates a method for capturing video data with respect to monitoring and surveillance using an in-vehicle camera assembly. The method 60 comprises the steps of capturing 61 video data by the camera unit. IN a further step of receiving 62 the streaming unit receives the video data and transmits, the video data over a telecommunication network to a video processing server. In a further step of receiving 63, the camera unit receives a selected modus, from a video processing server, over a telecommunication network, and the stream unit tunes 64 the streaming unit based on the received modus.

Other variations to the disclosed examples can be understood and effected by those skilled in the art of practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, can be modified and enhanced by those skilled in the art beyond the scope of the present disclosure as disclosed in the appended claims without having to apply inventive skills.

The invention claimed is:

1. A monitoring and surveillance system arranged for processing video data associated with a vehicle, said system being arranged to operate in at least a surveillance streaming mode and a conversational streaming mode associated with respective first and second latency requirements for said video data, the second latency requirement being less than the first latency requirement, said system comprising:
    a video processing server arranged to:
        select a mode from at least the surveillance streaming mode and the conversational streaming mode,
        communicate the selected mode via the telecommunication network, and
        receive buffered video data according to the selected mode; and
    a camera assembly arranged for installation in said vehicle and comprising:
        a camera arranged to capture video data;
        a transmitting queue arranged to receive and buffer the captured video data for transmission to the video processing server; and
        a source controller arranged to:
            receive, via the telecommunication network, the mode selected by the video processing server;

cause said transmitting queue to transmit the buffered video data to the video processing server via the telecommunication network, in accordance with the mode selected by the video processing server; and when the received mode is the conversational streaming mode, cause said transmitting queue to discard buffered video data packets which are older than the second latency requirement.

2. The system of claim 1, wherein
said video processing server comprises a receiving queue arranged for queuing video data packets received from the transmitting queue of the camera assembly.

3. The system of claim 2, wherein:
said video processing server is further arranged to:
select a mode by switching from said first mode to said second mode,
communicate the selected second mode to said source controller, and
subsequently discard video data packets buffered in the receiving queue which are older than the second latency requirement; and
said source controller is further arranged to cause the transmitting queue to discard the buffered video data packets which are older than the second latency requirement, in response to receiving said selected conversational streaming mode from said video processing server.

4. The system of claim 3, wherein said source controller is further arranged to determine a due deadline for transmitting a video data packet in said transmitting queue to said video processing server based on at least one of:
a network jitter buffer duration; and
frame durations of preceding video data packets present in said transmitting queue.

5. The system of claim 1, wherein:
the camera is one of a plurality of cameras included in said system, and
the plurality of cameras are arranged to provide captured video data to said transmitting queue.

6. A camera assembly arranged for in-vehicle installation and for capturing video data with respect to monitoring and surveillance, said camera assembly being arranged to operate in at least a surveillance streaming mode and a conversational streaming mode associated with respective first and second latency requirements for said video data, the second latency requirement being less than the first latency requirement, said camera assembly comprising:
a camera arranged to capture video data;
a transmitting queue arranged to receive and buffer the captured video data for transmission to a video processing server via a telecommunication network; and
a source controller arranged to:
receive, via the telecommunication network, a mode selected by the video processing server;
cause said transmitting queue to transmit the buffered video data to the video processing server via the telecommunication network, in accordance with the received mode; and
when the received mode is the conversational streaming mode, cause said transmitting queue to discard buffered video data packets which are older than the second latency requirement.

7. The camera assembly of claim 6, wherein said source controller is further arranged to, when the received mode indicates a mode switch from the surveillance streaming mode to the conversational streaming mode, cause the transmitting queue to discard the buffered video data which are older than the second latency requirement.

8. The camera assembly of claim 7, wherein said source controller is further arranged to determine a due deadline for transmitting a video data packet in said transmitting queue to said video processing server based on at least one of:
a network jitter buffer duration; and
frame durations of preceding video data packets present in said transmitting queue.

9. The camera assembly of claim 6, wherein:
the camera is one of a plurality of cameras included in said camera assembly, and
the plurality of cameras are arranged to provide captured video data to said transmitting queue.

10. A method for capturing video data with respect to monitoring and surveillance using an in-vehicle camera assembly comprising a camera, a said transmitting queue, and a source controller, the method comprising:
capturing video data by said camera;
receiving, by said transmitting queue, said captured video data;
receiving, by said source controller via said telecommunication network, a mode selected by said video processing server, wherein the received mode is one of at least a surveillance streaming mode and a conversational streaming mode associated with respective first and second latency requirements for said video data, the second latency requirement being less than the first latency requirement;
by said source controller, causing said transmitting queue to transmit the buffered video data to the video processing server via the telecommunication network, in accordance with the received mode; and
by said source controller, when the received mode is the conversational streaming mode, causing the transmitting queue to discard buffered video data packets which are older than the second latency requirement.

11. The method of claim 10, wherein said source controller causing the transmitting queue to discard buffered video data packets which are older than the second latency requirement is further based on the received mode indicating a mode switch from the surveillance streaming mode to the conversational streaming mode.

12. The method of claim 11, further comprising determining, by said source controller, a due deadline for transmitting a video data packet in said transmitting queue to said video processing server based on at least one of:
a network jitter buffer duration; and
frame durations of preceding video data packets present in said transmitting queue.

13. The method of claim 10, further comprising when the received mode indicates a mode switch from the surveillance streaming mode to the conversational streaming mode, discarding video data packets in a receiving queue of said video processing server which are older than the second latency requirement.

14. A non-transitory, computer-readable medium having instructions that, when executed by an in-vehicle camera assembly arranged to capture video data with respect to monitoring and surveillance, configure the in-vehicle camera assembly to perform operations corresponding to the method of claim 10.

* * * * *